United States Patent
Drexler

(10) Patent No.: US 10,815,014 B2
(45) Date of Patent: Oct. 27, 2020

(54) SPACECRAFT COLLISION-AVOIDANCE PROPULSION SYSTEM AND METHOD

(71) Applicant: Jerome Drexler, Los Altos Hills, CA (US)

(72) Inventor: Jerome Drexler, Los Altos Hills, CA (US)

(\*) Notice: Subject to any disclaimer, the term of this patent is extended or adjusted under 35 U.S.C. 154(b) by 406 days.

(21) Appl. No.: 16/111,612

(22) Filed: Aug. 24, 2018

(65) Prior Publication Data
US 2020/0062426 A1    Feb. 27, 2020

(51) Int. Cl.
*B64G 1/56*    (2006.01)
*B64G 1/26*    (2006.01)
(Continued)

(52) U.S. Cl.
CPC ............... *B64G 1/26* (2013.01); *B64G 1/408* (2013.01); *B64G 1/52* (2013.01); *G21B 3/004* (2013.01); *G21H 7/00* (2013.01)

(58) Field of Classification Search
CPC ........ B64G 1/409; B64G 1/407; B64G 1/408; B64G 1/56; F03H 3/00; G21H 7/00
See application file for complete search history.

(56) References Cited

U.S. PATENT DOCUMENTS

| | | | |
|---|---|---|---|
| 4,036,012 A | * | 7/1977 | Monsler ............... F03H 1/00 60/203.1 |
| 2006/0126771 A1 | * | 6/2006 | Da Conceicao ......... G21G 1/04 376/100 |

(Continued)

FOREIGN PATENT DOCUMENTS

| | | |
|---|---|---|
| CA | 2153406 A1 | 7/1994 |
| JP | H08211190 A | 8/1996 |

(Continued)

OTHER PUBLICATIONS

Aguilar et al., "Precision Measurement of the Proton Flux in Primary Cosmic Rays from Rigidity 1 GV to 1.8 TV with the Alpha Magnetic Spectrometer on the International Space Station", Physical Review Letters, PRL 114, 171103, May 1, 2015, 9 pages.

(Continued)

*Primary Examiner* — J. Woodrow Eldred
(74) *Attorney, Agent, or Firm* — Thomas Schneck; Mark Protsik

(57) ABSTRACT

A collision-avoidance propulsion system and method for orbiting satellites and other spacecraft takes advantage of ambient cosmic rays in space to catalyze micro-fusion events via particle-target fusion and muon-catalyzed fusion processes, using the reaction products to produce thrust upon orbiting satellites and other spacecraft. A supply of deuterium-containing particle fuel material is propelled in a specified direction of the spacecraft in response to indication of a potential collision with another space object (e.g. orbiting debris). In one embodiment, this may be performed by propellant gas expelling the fuel material through conduits to specified ports on the exterior of the spacecraft. The propelled material interacts with the ambient cosmic rays and muon generated from those cosmic rays to induce micro-fusion. A portion of the energetic reaction products (e.g. alpha particles) are received upon the spacecraft to alter its trajectory in a manner that avoids the potential collision.

24 Claims, 3 Drawing Sheets

(51) Int. Cl.
  *B64G 1/40* (2006.01)
  *B64G 1/52* (2006.01)
  *G21B 3/00* (2006.01)
  *G21H 7/00* (2006.01)

(56) References Cited

U.S. PATENT DOCUMENTS

| | | | |
|---|---|---|---|
| 2008/0123793 | A1 | 5/2008 | Loan et al. |
| 2009/0000268 | A1* | 1/2009 | Yurash ............... G21B 1/01 60/202 |
| 2013/0005200 | A1* | 1/2013 | Mayburd ............. G21D 7/00 440/18 |
| 2015/0052886 | A1* | 2/2015 | Adams ................ G21C 1/32 60/512 |
| 2015/0098543 | A1* | 4/2015 | Cohen ................. G21B 1/052 376/131 |
| 2018/0033496 | A1* | 2/2018 | Sedwick ............. B64G 1/405 |

FOREIGN PATENT DOCUMENTS

| | | |
|---|---|---|
| WO | WO9013125 A1 | 11/1990 |
| WO | WO9222909 A1 | 12/1992 |
| WO | WO2014114986 A1 | 7/2014 |

OTHER PUBLICATIONS

Alvarez et al., "The Catalysis of Nuclear Reactions by mu Mesons", Lawrence Berkeley National Laboratory, Dec. 10, 1956, 5 pages.

Nakamura et al. (revised by Beatty et al.), "Cosmic Rays", JP G 37, 075021, Feb. 16, 2012, 21 pages.

Hassler et al., "Mars' Surface Radiation Environment Measured with the Mars Science Laboratory's Curiosity Rover", Science, Nov. 12, 2013, 35 pages.

Jackson, "A Personal Adventure in Muon-Catalyzed Fusion", Physics in Perspective 12, 2010, pp. 74-88.

Jackson, "Muon Catalysis of Fusion: A Commentary", Lawrence Berkeley Laboratory, Physics Division, Aug. 1984, 12 pages.

Kaye & Laby, NPL, "Cosmic Rays", 4 pages, http://www.kayelaby.npl.co.uk/general_physics/2_7/2_7_7.html.

Kaye & Laby, NPL, "Nuclear Fusion", 9 pages, http://www.kayelaby.npl.co.uk/atomic_and_nuclear_physics/4_7/4_7_4.html.

Cucinotta et al., "Space Radiation Cancer Risk Projections and Uncertainties—2012", NASA/TP-2013-217375, Jan. 2013, chapter 2—pp. 9-41.

Nuclear Power, "Photoneutrons", Nov. 3, 2015, 3 pages, https://www.nuclear-power.net/nuclear-power/fission/delayed-neutrons/photoneutrons/>.

U.C. Berkeley Physics 250, "Cosmic Rays", Neutrino/Nuclear Astrophysics, Spring 2011, Class Notes, Chapter 9, pp. 1-36, available from Univ. of Washington, www.int.washington.edu/PHYS554/2011/chapter9_11.pdf.

Beals et al., "Project Longshot: An Unmanned Probe to Alpha Centauri", U.S. Naval Academy, Report for 1987-1988, 74 pages.

J.J. Hopkins Laboratory for Pure and Applied Science, General Atomic division of General Dynamics, "Nuclear Pulse Space Vehicle Study", Chapter 2, Sep. 19, 1964, 30 pages.

Martin et al., "Project Daedalus: The Propulsion System—Part 1: Theoretical Considerations and Calculations", 1978, scan copy, 49 pages.

Schmidt et al., "Nuclear Pulse Propulsion—Orion and Beyond", 36th AIAA/ASME/SAE/ASEE Joint Propulsion Conference & Exhibit, Jul. 16-19, 2000, https://ntrs.nasa.gov/archive/nasa/casi.ntrs.nasa.gov/20000096503.pdf>.

SpaceX, "First-stage landing—Onboard camera", YouTube, May 27, 2016, 1 page, https://youtu.be/4jEz03Z8azc>.

Wikipedia—Space Debris, 25 pages.

J. Foust, SpaceNews, "Electric satellite propulsion company raises $10 million", Jul. 11, 2018, 3 pages.

R. Skibba, "Scientists test tiny labels for sorting out space debris", Jul. 31, 2018, 3 pages.

\* cited by examiner

SPACECRAFT COLLISION-AVOIDANCE PROPULSION SYSTEM AND METHOD

TECHNICAL FIELD

The present invention relates to providing thrust to orbiting satellites and other spacecraft, for collision avoidance and other trajectory or orbital adjustments, and further relates to inducement of controlled muon-catalyzed nuclear micro-fusion, as well as micro-fusion obtained from fuel bombardment with high-energy particles (particle-target fusion).

BACKGROUND ART

Many thousands of known pieces of debris are present in low Earth orbit (LEO). The United States Strategic Command tracks nearly 20000 artificial objects in orbit that are large enough to be detected. These not only include nearly 2000 operational satellites, but many more defunct payloads, intact rocket bodies (mainly second-stage boosters), and explosion/collision debris fragments. Over 500,000 undetected objects larger than about 1 cm are estimated to be in orbit. Because of the potential hazards to operational satellites, those satellites are equipped with Whipple shielding to dissipate kinetic energy from collisions with very small objects. Collision avoidance maneuvers are used to evade collisions with the larger known debris. One prime example of the danger is the 2009 accidental collision between Cosmos 2251 and Iridium 33, which not only knocked the satellites out of operation but also generated collision fragments that represent an ongoing threat to other spacecraft. Even collision with an object as small as a 1 cm bolt could, if the relative velocity is high enough, permanently disable a satellite.

In recent years, mitigation efforts have been made to limit debris population growth by minimizing the creation of new debris. Any unused fuel remaining in the spent second-stage boosters is vented into space to prevent explosions. Controlled reentry of space objects into the South Pacific gyre (around "Point Nemo") over 2500 km from the nearest land is encouraged. Satellites in higher geosynchronous orbits are boosted at the end of their lifetimes into super-synchronous graveyard orbits (about 300 km above geostationary orbit). Even so, existing debris continues to represent a danger and the introduction of small satellites (<500 kg mass) including CubeSats will represent a challenge to collision avoidance. One recent proposal from David Palmer and others at Los Alamos National Laboratory is equip small satellites with transponders modeled after those used on aircraft. This will make detection of such orbiting objects much easier.

Collision avoidance maneuvers involve altering the orbital trajectory of the satellite in some fashion, e.g. increasing (or decreasing) velocity and altitude. This typically involves a change in speed or delta-v by expelling reaction mass in a selected direction. Expelling such mass in a forward direction slows the spacecraft and reduces orbital altitude, while expelling such mass in a backward direction accelerates the spacecraft and increases orbital altitude. Change in altitude could also be accomplished by an upward or downward expelling of reaction mass. The reaction mass may result from chemical combustion, or electrical ionization of a propellant, with expulsion through a thruster nozzle. A wide variety of propulsion methods are known. Chemical propulsion is mainly used for orbital maneuvers because of the amount of thrust and delta-v generated, whereas ionic propulsion tends to generate lower thrusts (e.g. 80 mN from a few kilowatts of electrical input) but can still be used for station-keeping operations once a desired orbit has been achieved. Either variety might be used for collision avoidance, depending on the lead warning time, because the orbital trajectory need only be altered by a small amount.

One example of a new generation of ionic propulsion is NASA's X3 thruster which is a form of Hall thruster that uses a stream of ions to propel a spacecraft. Because it employs multiple channels of plasma rather than just one, it can generate 5.4 N of thrust from about 100 kW input power. A tenfold improvement in efficiency means the thruster requires much less propellant.

Existing thrust methods require a budget of propellant mass to expel for a specified cumulative delta-v over a spacecraft's life. This adds to the satellite's overall mass.

Muon-catalyzed fusion was observed by chance in late 1956 by Luis Alvarez and colleagues during evaluation of liquid-hydrogen bubble chamber images as part of accelerator-based particle decay studies. These were rare proton-deuteron fusion events that only occurred because of the natural presence of a tiny amount of deuterium (one part per 6400) in the liquid hydrogen. It was quickly recognized that fusion many orders of magnitude larger would occur with either pure deuterium or a deuterium-tritium mixture. However, John D. Jackson (Lawrence Berkeley Laboratory and Prof. Emeritus of Physics, Univ. of California, Berkeley) correctly noted that for useful power production there would need to be an energetically cheap way of producing muons. The energy expense of generating muons artificially in particle accelerators combined with their short lifetimes has limited its viability as an Earth-based fusion source, since it falls short of break-even potential.

Another controlled fusion technique is particle-target fusion which comes from accelerating a particle to sufficient energy so as to overcome the Coulomb barrier and interact with target nuclei. To date, proposals in this area depend upon using some kind of particle accelerator. Although some fusion events can be observed with as little as 10 KeV acceleration, fusion cross-sections are sufficiently low that accelerator-based particle-target fusion are inefficient and fall short of break-even potential.

It is known that cosmic rays are abundant in interplanetary space. Cosmic rays are mainly high-energy protons (with some high-energy helium nuclei as well) with kinetic energies in excess of 300 MeV. Most cosmic rays have GeV energy levels, although some extremely energetic ones can exceed $10^{18}$ eV. FIG. 3 shows cosmic ray flux distribution at the Earth's surface. In near-Earth space, the alpha magnetic spectrometer (AMS-02) instrument aboard the International Space Station (ISS) since 2011 has recorded an average of 45 million fast cosmic ray particles daily (approx. 500 per second). The overall flux of galactic cosmic ray protons (above earth's atmosphere) can range from a minimum of 1200 $m^{-2}s^{-1}$ $sr^{-1}$ to as much as twice that amount. (The flux of galactic cosmic rays entering our solar system, while generally steady, has been observed to vary by a factor of about two over an 11-year cycle according to the magnetic strength of the heliosphere.) Outside of Earth's protective magnetic field (e.g. in interplanetary space), the cosmic ray flux is expected to be several orders of magnitude greater. As measured by the Martian Radiation Experiment (MARIE) aboard the Mars Odyssey spacecraft, average in-orbit cosmic ray doses were about 400-500 mSv per year, which is an order of magnitude higher than on Earth.

Cosmic rays are known to generate abundant muons from the decay of cosmic rays passing through Earth's atmosphere. Cosmic rays lose energy upon collisions with atmospheric dust, and to a lesser extent atoms or molecules, generating elementary particles, including pions and then muons, usually within a penetration distance of a few cm. Typically, hundreds of muons are generated per cosmic ray particle from successive collisions. Near sea level on Earth, the flux of muons generated by the cosmic rays' interaction by the atmosphere averages about 70 $m^{-2}s^{-1}sr^{-1}$. The muon flux is even higher in the upper atmosphere. These relatively low flux levels on Earth reflect the fact that both Earth's atmosphere and geomagnetic field substantially shields our planet from cosmic ray radiation. Mars is a different story, having very little atmosphere (only 0.6% of Earth's pressure) and no magnetic field, so that muon generation at Mars' surface is expected to be very much higher than on Earth's surface. Planetary moons, such as Phobos and Deimos around Mars, would experience similar high levels of cosmic ray flux.

Several projects have explored the possibility of nuclear spacecraft propulsion. The first of these was Project Orion from 1958-1963 built upon general proposals in the 1940s by Stanislaw Ulam and others, in which external atomic detonations would form the basis for a nuclear pulse drive. Later, between 1973 and 1978, Project Daedalus of the British Interplanetary Society considered a design using inertial confinement fusion triggered by electron beams directed against fuel pellets in a reaction chamber. From 1987 to 1988, Project Longshot by NASA in collaboration with the US Naval Academy developed a fusion engine concept also using inertial confinement fuel pellets but this time ignited using a number of lasers. Naturally, these last two projects depend upon successfully achieving nuclear fusion.

SUMMARY DISCLOSURE

The present invention is a satellite or other spacecraft propulsion technology that takes advantage of the abundance of cosmic rays in space to catalyze fusion events in enough amounts to produce useable thrust. The thrust enables orbits and other flight trajectories of such satellites and spacecraft to be altered, especially to avoid potential collisions with any orbiting debris, incoming micro-asteroids or comet fragments, or even with other spacecraft. The cosmic rays together with muons generated from such cosmic rays are available here for free and do not need to be generated artificially in an accelerator.

A spacecraft collision avoidance propulsion system for use in the presence of an ambient flux of cosmic rays has a supply of deuterium-containing particle fuel material. The fuel material could be stored in a small radiation vault in the interior of the satellite or other spacecraft. Means, such as a gas-propelled conduit system can, responsive to an indication of a potential collision with a space object, project some of the stored fuel material in a specified direction outward from the spacecraft. The projection of fuel and propellant will itself provide some of the thrust, but the fuel material will also interact with the ambient flux of cosmic rays to generate energetic fusion products, such as alpha particles. At least some portion of those generated kinetic-energy-containing products are received against the exterior of the spacecraft to produce thrust that provides a change of trajectory to avoid the indicated potential collision. The deuterium-containing fuel material (e.g. $Li^6D$ or $D_2O$) can be in small pellet form that is smaller than 1 cm to minimize risk to other spacecraft with similar orbit or trajectory, or the fuel can be in powder, liquid or gaseous form.

Hence, in a method of spacecraft propulsion for use in the presence of an ambient flux of cosmic rays for collision avoidance, deuterium-containing particle fuel material is projected, responsive to an indication of a potential collision with a space object, in one or more specified directions outward from a spacecraft, and the exterior of the craft is given sufficient thrust by energetic particles from fuel interactions with the ambient cosmic rays so as to change its trajectory and avoid the indicated potential collision. The spacecraft may be a satellite in an orbit around a planet or moon, such as in Earth orbit. The space objects from which potential collisions need to be avoided can be another satellite or spacecraft, but (at least in Earth orbit) can be orbiting debris or "space junk". Indications of a potential collision can come via ground communication from space debris monitoring networks but, in some cases, might also be presented by onboard detection systems. The propulsion system could also be used for other orbit or trajectory adjustments and station-keeping tasks. In each case, the amount of thrust and total delta-V needed is quite small, since the craft will normally only need to move from its initial trajectory by an amount exceeding its own width or length. The change in trajectory can include an increase or decrease in velocity, an increase or decrease in orbital altitude, or a shift transverse to its initial trajectory. After danger of collision has passed, the craft can continue on its new trajectory or can again use the propulsion system in the opposite direction to restore its original orbit or trajectory.

Since the amount of energy needed for thrust is generally much less than the multi-kiloton yields of atomic weapons, "micro-fusion" is the term used here to refer to fusion energy outputs of not more than 10 gigajoules per second (2.5 tons of TNT equivalent per second), to thereby exclude macro-fusion type explosions.

DETAILED DESCRIPTION

Figure 1:
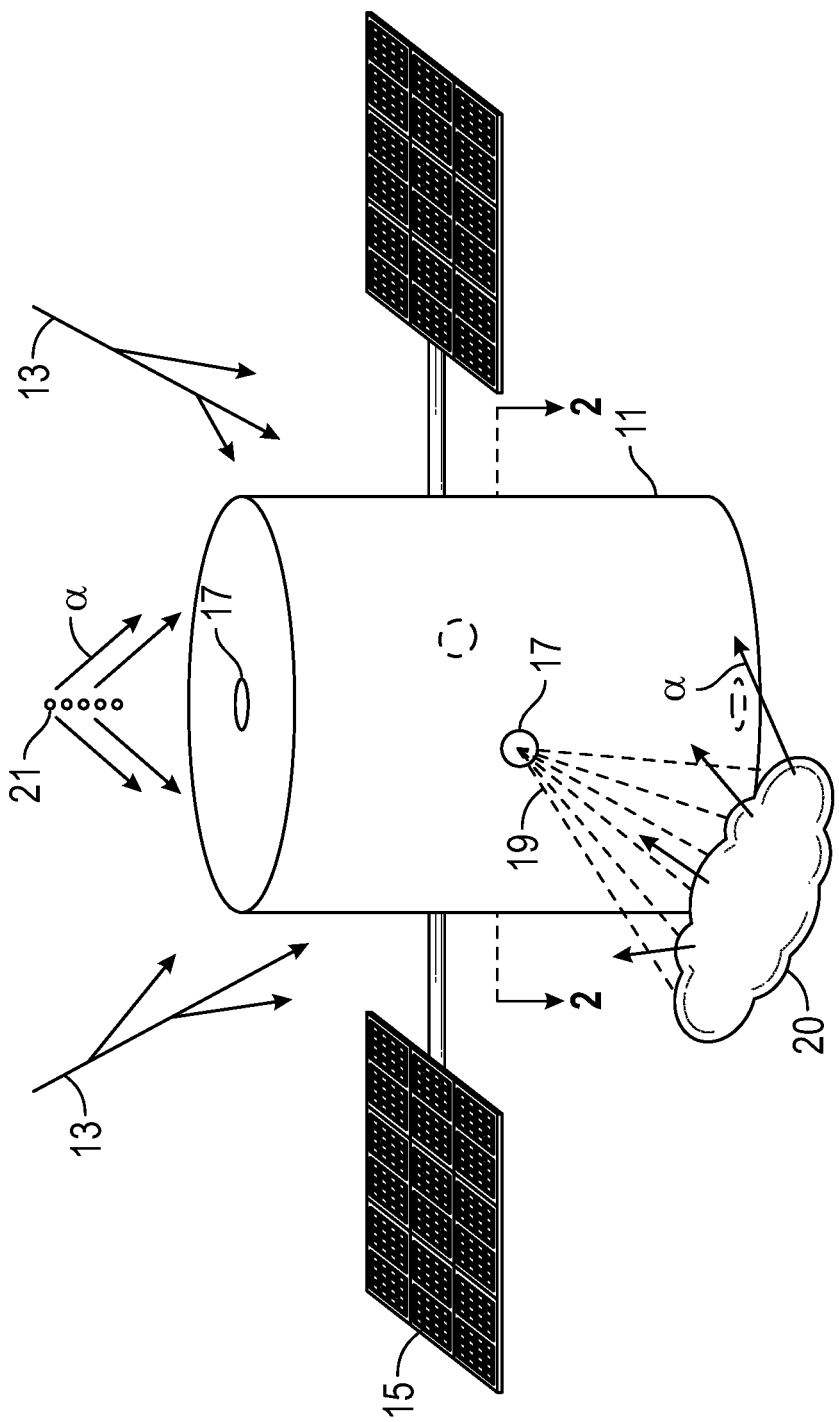
FIG. 1 is a perspective view of a satellite or other spacecraft containing an embodiment of a collision-avoidance propulsion system in accord with the present invention.

With reference to FIG. 1, one technique is to project the fusion target material outward from a spacecraft 11. In the example shown, the spacecraft 11 is a satellite, but other types of spacecraft can also have need of collision-avoidance propulsion systems. The satellite 11 can be powered by solar panels 15 (or alternatively, some internal power source) for its primary mission needs, but also for space object detection and external communication for ground-based collision warning. When an indication of an impending potential collision is detected or received, the collision-avoidance propulsion system will be activated to supply a desired change in trajectory to the satellite or other spacecraft 11.

For this purpose, a supply of deuterium-containing micro-fusion "fuel" material is provided, which can be solid $Li^6D$ in powder form, D-D or D-T inertial-confinement-fusion-type pellets, $D_2O$ ice crystals. When thrust is needed, one shoots "fuel" pellets 21 as a series of projectiles, e.g. once per second. Alternatively, the fuel can be a propellant gas mixed with micro-fusion fuel powder 19 that can then disperse as a localized cloud 20. The fuel is seen leaving the spacecraft 11 through one or more ports 17 on its exterior. The fuel pellets 21 or dispersed cloud of target material 19 will be exposed to both cosmic rays 13 and to their generated muons. The spacecraft propulsion system works in the presence of an ambient flux of cosmic rays and/or muons which interact with the cloud and trigger the nuclear micro-fusion of the particle target material, either by particle-target fusion or muon-catalyzed fusion or both. As cosmic rays 13 collide with micro-fusion targets 19 and 21 and dust, they form muons that are captured by the deuterium and that catalyze fusion. Likewise, the cosmic ray collisions themselves can directly trigger particle-target micro-fusion. In order to assist muon formation in the vacuum of space, especially when $D_2O$ is used, the target package may contain up to 20% by weight of added non-fuel powder or fine dust particles in the mixture. Fusion products ($\alpha$) having significant kinetic energy are generated and are received at some portion of the spacecraft 11 to produce thrust upon the spacecraft.

Figure 2:
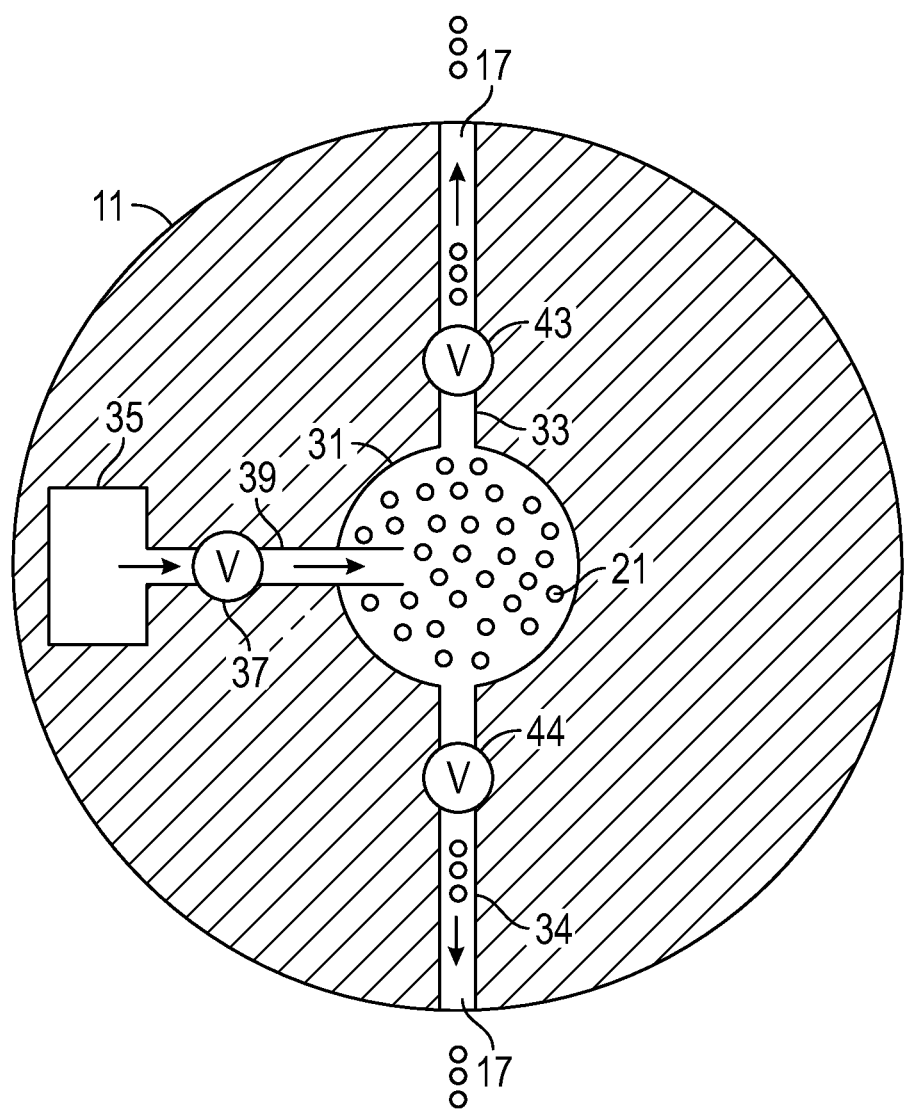
FIG. 2 is a sectional view taken along the direction 2-2 in FIG. 1 showing the interior of an embodiment of the collision-avoidance propulsion system.
Figure 3:
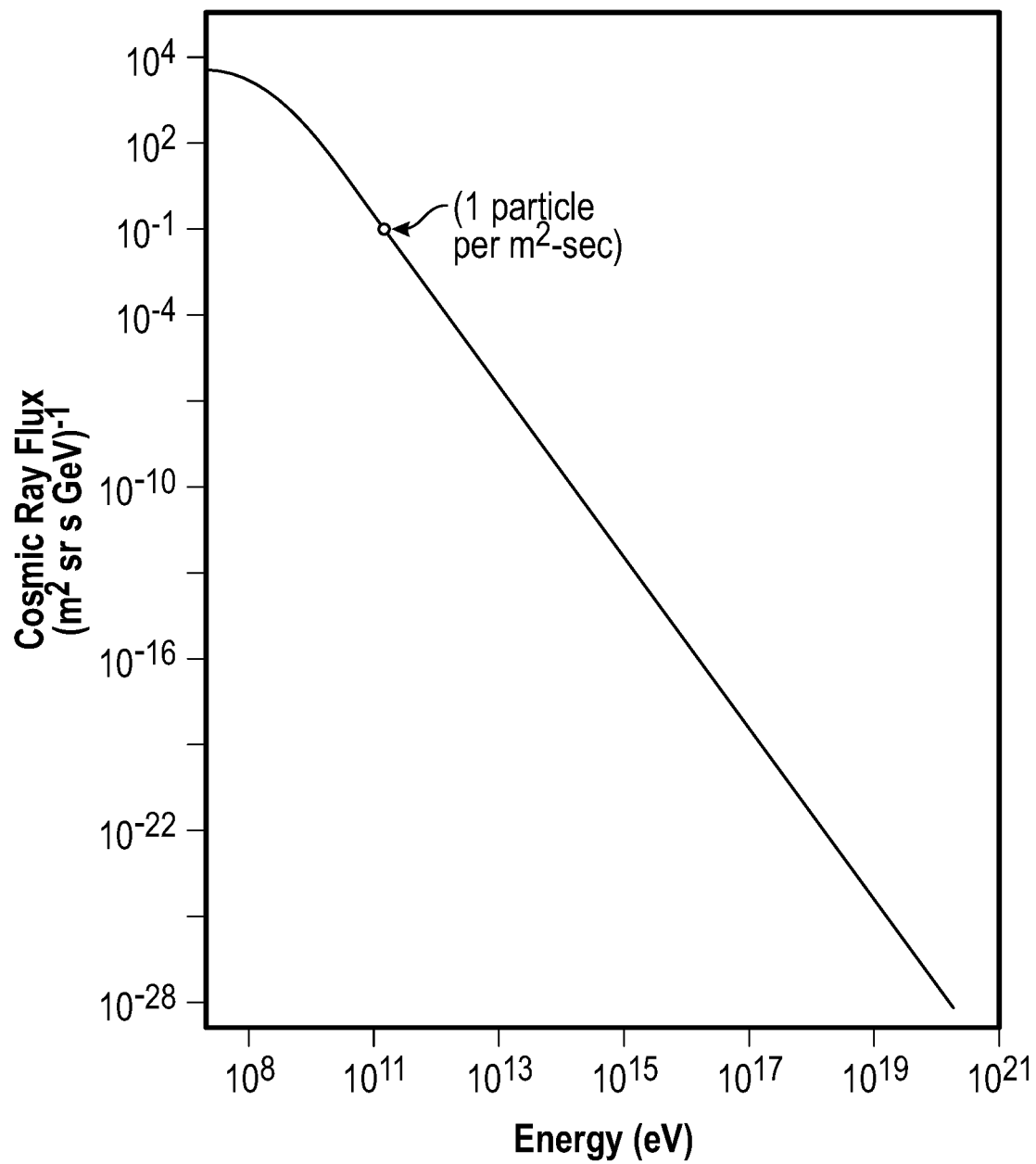
FIG. 3 is a graph showing cosmic ray flux distribution (versus cosmic ray energies) at the Earth's surface.

With reference to FIG. 2, inside the satellite or other space craft, micro-fusion fuel material 21 is stored in a shielded radiation vault 31 until needed. Stored fuel will be shielded to reduce or eliminate premature fusion events until they are to be delivered to outside of the spacecraft. One need not eliminate cosmic rays or their secondary particles (pions, muons, etc.) to zero, but merely reduce their numbers and energies sufficiently to keep them from catalyzing sufficiently large numbers of fusion events in the stored target particle material. Additionally, since the use of micro-fusion fuel is expected to reduce the required amount of chemical rocket propellant by at least a factor of two, one can easily afford the extra weight of some small amount of metal for shielding, if needed. For example, the Juno spacecraft to Jupiter contains radiation vaults of 1 cm thick titanium to shield its electronics from external radiation. A similar type of vault 31 could be used in this case for the shielding the stored fuel.

One way to project the micro-fuel out of the spacecraft is to employ a type of air-gun mechanism using a store 35 of chemical propulsion gases (e.g. xenon; but lighter substances such as butane or carbon dioxide might also be used) already being used for orbital station-keeping. Here, the quantities needed would be significantly smaller due to the additional thrust provided by the added micro-fusion fuel. In one possible embodiment, the supply 35 of propulsion gas may be connected through a valve 37 and conduit 39 to the vault 31 containing micro-fusion fuel material 21, expelling some of that fuel along with propellant gas through conduits 33 and 34 with respective valves 43 and 44. Valves 37 is opened to load the vault 21 with a quantity of pressurized propellant gas from store 35. A selected one of the valves 43 and 44 is opened to expel a quantity of propellant and micro-fusion material through one of the ports 17 in the spacecraft.

Micro-fusion fuel targets (typically in small solid pellet, frozen ice, or powder form) when shot or otherwise projected externally from the spacecraft will interact with the flux of cosmic rays and muons such that some combination of particle-target micro-fusion and/or muon-catalyzed micro-fusion will take place, generating a thrust against the vehicle. The deuterium "fuel" for the particle-target and/or muon-catalyzed micro-fusion may be supplied in the form of solid $Li^6D$, or even heavy water ($D_2O$). Muon-created muonic deuterium can come much closer to the nucleus of a similar neighboring atom with a probability of fusing deuterium nuclei, releasing energy. Once a muonic molecule is formed, fusion proceeds extremely rapidly (on the order of $10^{-10}$ sec). Other types of micro-fusion reactions besides D-D are also possible depending upon the target material. For example, another reaction is $Li^6+D \rightarrow 2He^4+22.4$ MeV, where much of the useful excess energy is carried as kinetic energy of the two helium nuclei (alpha particles). One cosmic ray particle can generate hundreds of muons, and each muon can typically catalyze about 100 micro-fusion reactions before it decays (the exact number depending on the muon "sticking" cross-section to any helium fusion products).

Additionally, cosmic rays can themselves directly stimulate a micro-fusion event by particle-target fusion, wherein the high energy cosmic ray particles (mostly protons, but also helium nuclei) bombard relatively stationary target material. When bombarded directly with cosmic rays, the lithium may be transmuted into tritium which could form the basis for some D-T micro-fusion reactions. Although D-D micro-fusion reactions occur at a rate only 1% of D-T fusion, and produce only 20% of the energy by comparison, the freely available flux of cosmic rays and their generated muons should be sufficient to yield sufficient micro-fusion energy output for practical use.

The present invention achieves nuclear micro-fusion using deuterium-containing target material, and the ambient flux of cosmic rays and generated muons that are already naturally present in the space environment. The optimum concentration of the target material for the particle-target and muon-catalyzed fusion may be determined experimentally based on the particular abundance of cosmic rays with a view to maintaining billions of micro-fusion events for producing adequate thrust for the specified application, while avoiding any possibility of a runaway macro-fusion event.

At a minimum, since both particle-target micro-fusion and muon-catalyzed micro-fusion, while recognized, are still experimentally immature technologies (since measurements have only been conducted to date on Earth using artificially accelerated particles and generated muons from particle accelerators), various embodiments of the present invention can have research utility to demonstrate feasibility in environments beyond Earth's protective atmosphere (e.g. on satellite platforms). Later, the concept can be extended to environments beyond Earth's magnetic field, e.g. in orbit around the Moon, Mars, or other planets or their moons in order to determine optimum parameters for various utilities in those environments. For example, the actual number of fusion reactions for various types of micro-fusion fuel sources and target configurations, and the amount of rocket thrust that can be derived from such reactions, are still unknown and need to be fully quantified in order to improve the technology. The fusion-enhanced space vehicle requires strong cosmic ray flux to create sufficient nuclear micro-fusion for thrust purposes.

Besides D-D micro-fusion reactions, other types of micro-fusion reactions may also occur (e.g. D-T, using tritium generated by cosmic rays impacting the lithium-6; as well as $Li^6$-D reactions from direct cosmic ray collisions). For this latter reaction, it should be noted that naturally occurring lithium can have an isotopic composition ranging anywhere from as little as 1.899% to about 7.794% $Li^6$, with most samples falling around 7.4% to 7.6% $Li^6$. Although LiD that has been made from natural lithium sources can be used in lower thrust applications or to inhibit runaway macro-fusion events, fuel material that has been enriched with greater proportions of $Li^6$ is preferable for achieving greater thrust and efficiency.

The micro-fusion reaction creates a kind of external "combustion" in the form of micro-fusion events resulting in production of energetic reaction products that will provide thrust against the spacecraft for altering its velocity and trajectory. However, the amount of energy generated depends upon the quantity of fuel released and the quantity of available cosmic rays and muons. Assuming most of the energy can be captured and made available for thrust, an estimated $10^{15}$ individual micro-fusion reactions (less than 1 µg of fuel consumed) per second would be required for 1 kW output. But as each cosmic ray can create hundreds of muons and each muon can catalyze about 100 reactions, the available cosmic ray flux in space is believed to be sufficient for this rocket thrust purpose following research, development, and engineering efforts.

What is claimed is:

1. A spacecraft collision avoidance propulsion system for use in the presence of an ambient flux of cosmic rays, comprising:
   a supply of deuterium-containing particle fuel material;
   a store of pressurized propellant, with valves responsive to a received indication of a potential collision with a space object, for projecting the deuterium-containing particle fuel material in a specified direction outward from a spacecraft, the projected material interacting with the ambient flux of cosmic rays to generate products having kinetic energy,
   the spacecraft receiving at least some portion of the generated kinetic-energy-containing products to produce thrust upon the spacecraft to provide a change of trajectory of at least a dimension of the spacecraft to avoid the indicated potential collision.

2. The propulsion system as in claim 1, wherein the spacecraft is in an orbit around a planet or moon.

3. The propulsion system as in claim 1, wherein the space object is orbiting debris.

4. The propulsion system as in claim 1, wherein the space object is another spacecraft.

5. The propulsion system as in claim 1, wherein the deuterium-containing particle fuel material comprises $Li^6D$.

6. The propulsion system as in claim 1, wherein the deuterium-containing particle fuel material comprises $D_2O$.

7. The propulsion system as in claim 1, wherein the deuterium-containing particle fuel material comprises $D_2$.

8. The propulsion system as in claim 1, wherein the deuterium-containing particle fuel material is in solid powder form.

9. The propulsion system as in claim 1, wherein the deuterium-containing particle fuel material is in pellet form.

10. The propulsion system as in claim 1, wherein the deuterium-containing particle fuel material is in frozen form.

11. The propulsion system as in claim 1, wherein the deuterium-containing particle fuel material is in liquid droplet form.

12. The propulsion system as in claim 1, wherein the deuterium-containing particle fuel material also contains up to 20% by weight of added non-fuel powder or dust particles.

13. A method of spacecraft propulsion for use in the presence of an ambient flux of cosmic rays for collision avoidance, comprising:
    projecting with pressurized propellant, through valves responsive to a received indication of a potential collision with a space object, deuterium-containing particle fuel material in a specified direction outward from a spacecraft, the projected material interacting with the ambient flux of cosmic rays to generate products having kinetic energy; and
    receiving on the spacecraft at least some portion of the generated kinetic-energy-containing products to produce thrust upon the spacecraft to provide a change of trajectory of at least a dimension of the spacecraft to avoid the indicated potential collision.

14. The method as in claim 13, wherein the spacecraft is in an orbit around a planet or moon.

15. The method as in claim 13, wherein the space object is orbiting debris.

16. The method as in claim 13, wherein the space object is another spacecraft.

17. The method as in claim 13, wherein the deuterium-containing particle fuel material is $Li^6D$.

18. The method as in claim 13, wherein the deuterium-containing particle fuel material is $D_2O$.

19. The method as in claim 13, wherein the deuterium-containing particle fuel is $D_2$.

20. The method as in claim 13, wherein the deuterium-containing particle fuel material is in solid powder form.

21. The method as in claim 13, wherein the deuterium-containing particle fuel material is in pellet form.

22. The method as in claim 13, wherein the deuterium-containing particle fuel material is in frozen form.

23. The method as in claim 13, wherein the deuterium-containing particle fuel material is in liquid droplet form.

24. The method as in claim 13, wherein the deuterium-containing particle fuel material also contains up to 20% by weight of added non-fuel powder or dust particles.

* * * * *